US008868847B2

(12) United States Patent
Gonion

(10) Patent No.: US 8,868,847 B2
(45) Date of Patent: Oct. 21, 2014

(54) MULTI-CORE PROCESSOR SNOOP FILTERING

(75) Inventor: Jeffry Gonion, Campbell, CA (US)

(73) Assignee: Apple Inc., Cupertino, CA (US)

(*) Notice: Subject to any disclaimer, the term of this patent is extended or adjusted under 35 U.S.C. 154(b) by 983 days.

(21) Appl. No.: 12/402,244

(22) Filed: Mar. 11, 2009

(65) Prior Publication Data

US 2010/0235586 A1    Sep. 16, 2010

(51) Int. Cl.
*G06F 12/00* (2006.01)
*G06F 12/08* (2006.01)
*G06F 12/10* (2006.01)

(52) U.S. Cl.
CPC ........ *G06F 12/0831* (2013.01); *G06F 12/1045* (2013.01)
USPC ............................ 711/146; 711/207; 711/221

(58) Field of Classification Search
CPC ........................ G06F 12/0831; G06F 12/1045
USPC .......................................................... 711/146
See application file for complete search history.

(56) References Cited

U.S. PATENT DOCUMENTS

| | | | |
|---|---|---|---|
| 5,265,232 A | 11/1993 | Gannon et al. | |
| 5,584,017 A | 12/1996 | Pierce et al. | |
| 5,890,217 A * | 3/1999 | Kabemoto et al. | 711/141 |
| 6,044,446 A | 3/2000 | Joy et al. | |
| 6,094,726 A | 7/2000 | Gonion et al. | |
| 6,105,113 A * | 8/2000 | Schimmel | 711/146 |
| 6,598,123 B1 | 7/2003 | Anderson et al. | |
| 6,615,319 B2 | 9/2003 | Khare et al. | |
| 6,629,205 B2 | 9/2003 | Cypher | |
| 6,823,409 B2 | 11/2004 | Jones et al. | |
| 6,868,485 B1 | 3/2005 | Conway | |
| 6,959,364 B2 * | 10/2005 | Safranek et al. | 711/146 |
| 7,047,322 B1 | 5/2006 | Bauman et al. | |
| 7,093,079 B2 | 8/2006 | Quach et al. | |
| 7,096,323 B1 | 8/2006 | Conway et al. | |
| 7,380,071 B2 | 5/2008 | Blumrich et al. | |
| 7,395,419 B1 | 7/2008 | Gonion | |
| 7,472,253 B1 | 12/2008 | Cameron et al. | |
| 7,805,575 B1 * | 9/2010 | Agarwal et al. | 711/141 |
| 7,877,549 B1 * | 1/2011 | Panwar et al. | 711/141 |
| 7,890,700 B2 * | 2/2011 | Choy et al. | 711/124 |

(Continued)

OTHER PUBLICATIONS

J. Cantin et al., "Course-Grain Coherence Tracking: RegionScout and Region Coherence Arrays," IEEE Micro, Jan./Feb. 2006. pp. 70-79.

(Continued)

*Primary Examiner* — April Y Blair
*Assistant Examiner* — Prasith Thammavong
(74) *Attorney, Agent, or Firm* — Meyertons, Hood, Kivlin, Kowert & Goetzel, P.C.

(57) ABSTRACT

Systems, methods, and devices for reducing snoop traffic in a central processing unit are provided. In accordance with one embodiment, an electronic device includes a central processing unit having a plurality of cores. A cache memory management system may be associated with each core that includes a cache memory device configured to store a plurality of cache lines, a page status table configured to track pages of memory stored in the cache memory device and to indicate a status of each of the tracked pages of memory, and a cache controller configured to determine, upon a cache miss, whether to broadcast a snoop request based at least in part on the status of one of the tracked pages in the page status table.

15 Claims, 13 Drawing Sheets

(56) References Cited

U.S. PATENT DOCUMENTS

| | | | |
|---|---|---|---|
| 2002/0129211 A1* | 9/2002 | Arimilli et al. | 711/146 |
| 2002/0144079 A1* | 10/2002 | Willis et al. | 711/205 |
| 2003/0115402 A1* | 6/2003 | Dahlgren et al. | 711/1 |
| 2004/0073755 A1* | 4/2004 | Webb et al. | 711/144 |
| 2005/0216701 A1* | 9/2005 | Taylor | 712/34 |
| 2006/0004996 A1 | 1/2006 | Gonion | |
| 2006/0190946 A1* | 8/2006 | Kissell | 718/108 |
| 2007/0022255 A1 | 1/2007 | Cantin et al. | |
| 2007/0150663 A1* | 6/2007 | Mendelson et al. | 711/141 |
| 2008/0114968 A1 | 5/2008 | Gonion et al. | |
| 2008/0114969 A1 | 5/2008 | Gonion et al. | |
| 2008/0147987 A1* | 6/2008 | Cantin et al. | 711/141 |
| 2008/0155200 A1* | 6/2008 | Conway | 711/146 |
| 2008/0183972 A1 | 7/2008 | Dieffenderfer | |
| 2008/0228759 A1 | 9/2008 | Maruhashi et al. | |
| 2008/0229076 A1 | 9/2008 | Gonion | |
| 2008/0288744 A1 | 11/2008 | Gonion et al. | |
| 2008/0288745 A1 | 11/2008 | Gonion et al. | |
| 2008/0288754 A1 | 11/2008 | Gonion et al. | |
| 2009/0063782 A1* | 3/2009 | Toussi | 711/144 |
| 2011/0055515 A1* | 3/2011 | Khubaib et al. | 711/207 |

OTHER PUBLICATIONS

L. Bigelow et al., "A Study on Snoop-Based Cache Coherence Protocols," (Apr. 17, 2008), http://users.ece.utexas.edu/~suleman/class_projects/pca_presentation.ppt.

V. Salapura et al., "Taming the cost of coherency for multicore systems," IBM Research Publication, last updated Dec. 1, 2008, http://domino.watson.ibm.com/comm/research.nsf/pages/r.arch.coherency.multicore.systems.html.

V. Salapura et al., "Design and Implementation of the Blue Gene P/Snoop Filter," 14th International Symposium on High-Performance Computer Architecture, HPCA '08, Feb. 18, 2008, available at http://www.fz-juelich.de/jsc/datapool/jugene/BlueGene_hpca08.pdf.

Moshovos; "RegionScout: Exploiting Coarse Grain Sharing in Snoop-Based Coherence"; Computer Architecture, 2005, ISCA '05, Proceedings, 32nd International Symposium on Computer Architecture, Jun. 4-8, 2005; pp. 234-245.

Cantin; "Coarse-Grain Coherence Tracking," Dissertation, University of Wisconsin at Madison, Jan. 2006; pp. 1-179.

* cited by examiner

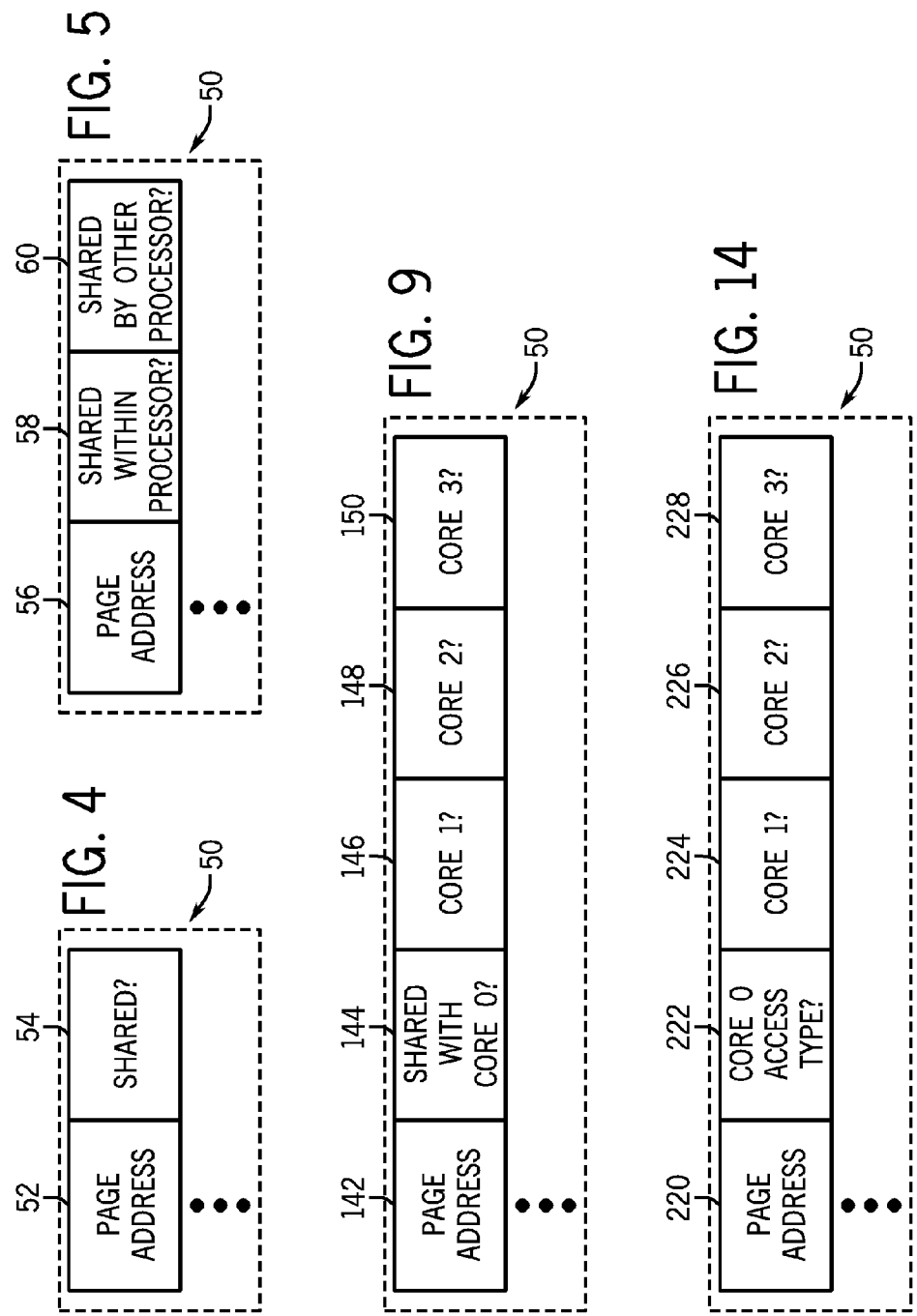

MULTI-CORE PROCESSOR SNOOP FILTERING

BACKGROUND

The present disclosure relates generally to cache memory management and, more particularly, to cache memory management in multi-core central processing units.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices of all types frequently rely on processors to perform computing tasks, which may process instructions or data stored in one or more memory devices. To improve processor efficiency, cache memory may store frequently- or recently-accessed memory in a form more rapidly accessible to the processor. When more than one processor has access to main memory, as may frequently occur in multi-core or other multiprocessor systems, a portion of the main memory may be simultaneously stored as cache memory associated with two or more processors. To maintain the integrity of memory used in multi-core or other multiprocessor systems, various cache coherence techniques have been devised.

One common cache coherence technique involves bus snooping, in which processors broadcast memory references to each other on a dedicated bus so that data can be transferred between caches rather than accessing main memory. While bus snooping may enable cache coherence, bus snooping may also consume resources, such as power and time, and thus may reduce processor efficiency. Moreover, as the number of processors in a multi-core or multiprocessor system increases, the amount of snooping and broadcasting may increase exponentially, reducing the efficiency of such systems accordingly.

SUMMARY

A summary of certain embodiments disclosed herein are set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to techniques for reducing snoop traffic in a central processing unit. In accordance with one embodiment, an electronic device includes a central processing unit having a plurality of cores. A cache memory management system may be associated with each core that includes a cache memory device configured to store a plurality of cache lines, a page status table configured to track pages of memory stored in the cache memory device and to indicate a status of each of the tracked pages of memory, and a cache controller configured to determine, upon a cache miss, whether to broadcast a snoop request based at least in part on the status of one of the tracked pages in the page status table.

BRIEF DESCRIPTION OF THE DRAWINGS

Various aspects of this disclosure may be better understood upon reading the following detailed description and upon reference to the drawings in which:

FIG. 4 is a block diagram illustrating an embodiment of a page status table for use in the central processing unit of FIG. 3, in accordance with aspects of the present disclosure;

FIG. 5 is a block diagram illustrating another embodiment of a page status table for use in the central processing unit of FIG. 3, in accordance with aspects of the present disclosure;

FIG. 9 is a block diagram illustrating another embodiment of a page status table for use in the central processing unit of FIG. 3, in accordance with aspects of the present disclosure;

FIG. 14 is a block diagram illustrating another embodiment of a page status table for use in the central processing unit of FIG. 3, in accordance with aspects of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
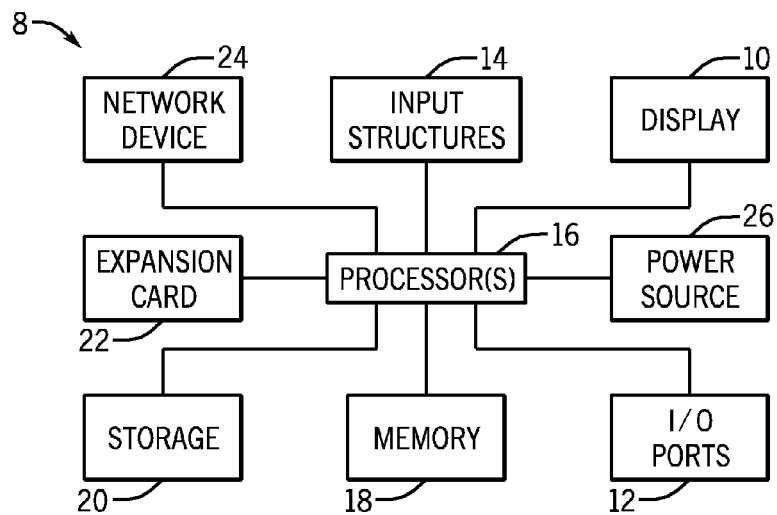
FIG. 1 is a block diagram of exemplary components of an electronic device, in accordance with aspects of the present disclosure.
Figure 2:
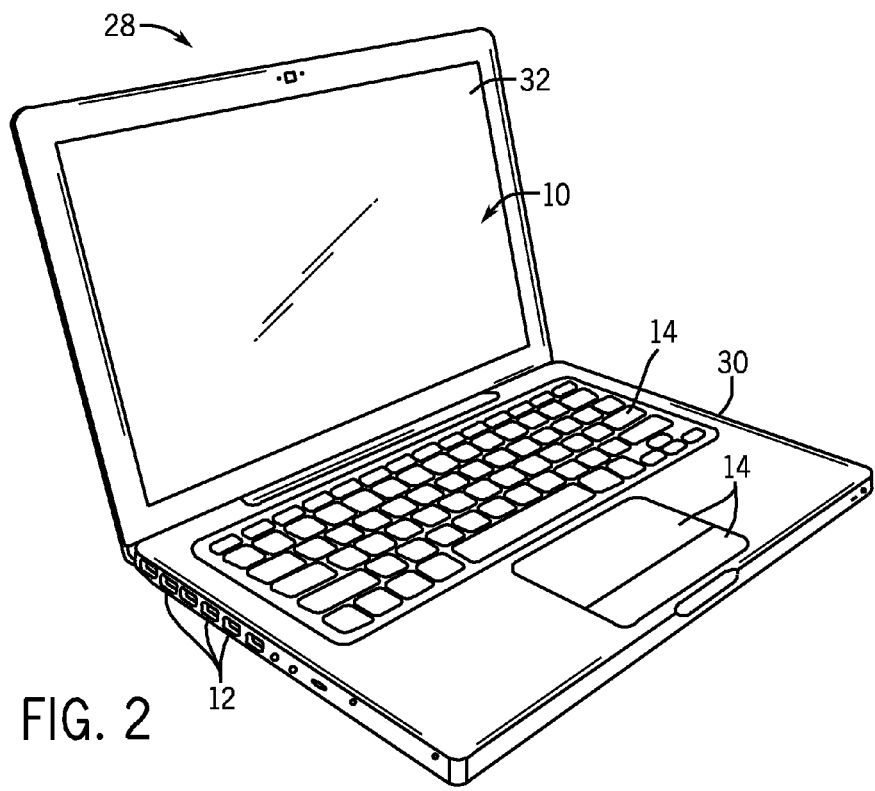
FIG. 2 is a view of a computer in accordance with aspects of the present disclosure.

With the foregoing in mind, a general description of suitable electronic devices capable of using the disclosed cache memory management techniques to provide cache coherence in a multi-core or multiprocessor system is provided below. In FIG. 1, a block diagram depicting various components that may be present in electronic devices suitable for use with the present techniques is provided. In FIG. 2, one example of a suitable electronic device, here provided as a computer system, is depicted. These types of electronic devices, and other electronic devices having comparable cache memory management capabilities, may be used in conjunction with the present techniques.

FIG. 1 is a block diagram illustrating various components and features of device 8. In the presently illustrated embodiment, such components may include display 10, input/output (I/O) ports 12, input structures 14, central processing unit (CPU) 16, memory device 18, non-volatile storage 20, expansion card(s) 22, networking device 24, and power source 26. Display 10 may display images for device 8 and I/O ports 12 may include ports configured to connect to a variety of external devices, such as a power source, headset or headphones. Input structures 14 may enable a user to interact with device 8, may include the various devices, circuitry, and pathways by which user input or feedback is provided to CPU 16, such as keypads or buttons.

CPU 16 may use data from memory device 18 or non-volatile storage 20 to execute an operating system, programs, GUI, and any other functions of device 8. In certain embodiments, the operating system stored on memory device 18 or non-volatile storage 20 may enable CPU 16 to dynamically update certain cache memory management hardware therein. Memory device 18 may include volatile memory, such as RAM, and/or non-volatile memory, such as ROM. Non-volatile storage 20 may include any persistent form of storage, including, for example, a hard drive or Flash memory. CPU 16 also may receive data through I/O ports 12, expansion card(s) 22, or network device 24, which may represent, for example, one or more network interface cards (NIC) or a network controller. Power source 26 may provide power to device 8 and may include one or more batteries, such as a lithium-ion polymer battery, or an AC power adapter.

Electronic device 8 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, electronic device 8 in the form of a computer may be a model of a MacBook®, MacBook® Pro, MacBook Air®, iMac®, Mac® mini, or Mac Pro® available from Apple Inc.

Figure 3:
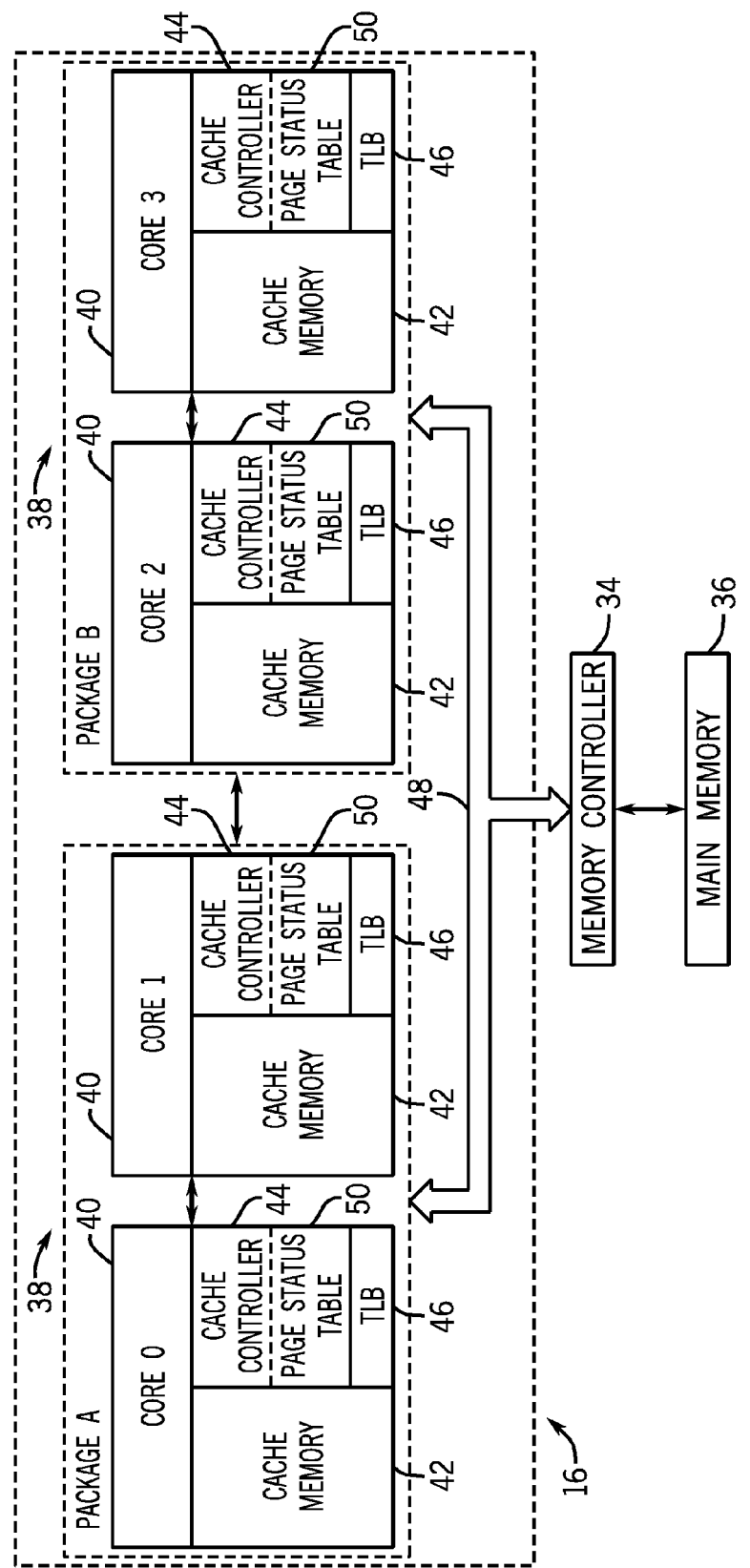
FIG. 3 is a block diagram illustrating an embodiment of a central processing unit of the electronic device of FIG. 1, in accordance with aspects of the present disclosure.

By way of example, electronic device 8 in the form of laptop computer 28 is illustrated in FIG. 3 in accordance with one embodiment of the present disclosure. The depicted computer 50 includes housing 52, a display 10 (such as the depicted liquid crystal display (LCD) 32), input structures 14, and I/O ports 12.

In one embodiment, input structures 14 (such as a keyboard and/or touchpad) may be used to interact with computer 28, such as to start, control, or operate a GUI or applications running on computer 28. For example, a keyboard and/or touchpad may allow a user to navigate a user interface or application interface displayed on display 10.

As depicted, electronic device 8 in the form of computer 50 may also include various input and output ports 12 to allow connection of additional devices. For example, computer 28 may include I/O port 12, which may include a USB port or other port, suitable for connecting to another electronic device, a projector, a supplemental display, and so forth. In addition, computer 28 may include network connectivity, memory, and storage capabilities, as described with respect to FIG. 1.

FIG. 3 illustrates an embodiment of CPU 16 of device 8 capable of employing the cache memory management techniques described below for maintaining cache coherence. As shown in FIG. 3, CPU 16 may communicably couple to memory controller 34, which may enable access to main memory 36. Main memory 36 may include any combination of memory 18 or storage 20 that has been allocated and mapped as main memory 36 by an operating system kernel running on CPU 16. Main memory 36 may be divided into pages of memory, each of which may be divided into a number of lines. For example, each page may include 64 lines, and each line may include 32 or 64 bits.

CPU 16 may include one or more processor packages 38, each of which may include one or more processor cores 40. The embodiment of CPU 16 shown in FIG. 3 includes two processor packages 38, designated respectively as "Package A" and "Package B." Both processor packages 38 shown in FIG. 3 each include two processor cores 40, which are designated as "Core 0," "Core 1," "Core 2," and "Core 3." However, it should be understood that CPU 16 may include any number of processor packages 38 having any number of processor cores 40.

A system of cache memory management associated with each processor core 40 may include cache memory 42, corresponding cache controller 44, and translation lookaside buffer (TLB) 46. Cache memory 42 may include any suitable form of rapidly-accessible memory, such as SRAM, which may store lines of main memory for use by the respective processor core 40. Because cache memory 42 may remain accessible only to one respective processor 40, cache memory 42 may represent Level 1 (L1) cache. In certain embodiments, Level 2 (L2) cache memory may be accessible to all processor cores 40 of a given processor package 38, but not accessible to processor cores 40 of other processor packages 38.

Cache controller 44 may enable processor core 40 to access cache memory 42, as well as perform techniques calculated to maintain cache coherence among the various other processor cores 40. When processor core 40 requests to read or write a cache line from cache memory 42 using a virtual memory address, processor core 40 may first consult TLB 46 to determine a corresponding physical address. TLB 46 may include a table with entries mapping virtual memory addresses used by processor 40 to physical memory addresses where corresponding memory is stored in main memory 36. The table of TLB 46 may hold a fixed number of page table entries (e.g., 4096 entries), which may be used to translate virtual memory addresses to physical addresses. With such a limited availability of page table entries, TLB 46 may maintain a record corresponding only to those pages most recently used by processor 40. Thus, when processor 40 requests a cache line from a page not listed among the page table entries of TLB 46, termed a "TLB miss," a new page table entry may be introduced into TLB 46 from a page table in main memory 36. To do so, TLB 46 may first remove an existing entry through any number of replacement policies including, for example, aging out the least recently used (LRU) table entry. Further techniques for maintaining page table entries in TLB 46 are discussed below with reference to FIGS. 16 and 20.

After obtaining a physical memory address from TLB 46, processor 40 may instruct cache controller 44 to seek access to the requested cache line in cache memory 42. If the requested cache line is present in cache memory 42, in an event termed a "cache hit," cache controller 44 may follow a predetermined cache coherence protocol, such as MSI, MESI, MOSI, MOESI, etc., in handling the cache line of memory based on a cache line status. Each cache line in cache memory 42 may include a cache line status encoded with the cache line, which may indicate a state of the cache line in accordance with the predetermined cache coherence protocol. For example, if the predetermined cache coherence protocol is a form of MESI, the cache line status encoded with each line may be two or more bits that signify whether the cache line is modified, exclusive, shared, or invalid. Based on the state of the cache line, cache controller 44 may access the cache line with or without communicating with other cache controllers 44, with or without first writing the cache line into main memory 36, and/or with or without first reading the cache line from cache memory 36. The particular predetermined cache coherence protocol used to encode a line status onto cache lines in cache memory 42 may be well known and, as such, is not discussed in greater detail herein. However, further cache coherence techniques involving a status not of each cache line, but rather a status of each page, are discussed below.

If cache controller 44 determines that the cache line requested by processor 40 is not present in cache memory 42, in an event termed a "cache miss," cache controller 44 may seek access to the requested line of memory from main memory 36. However, the requested line may be shared in another cache memory 42 belonging to another processor 40. Rather than undertake line-level measures to ensure cache coherence, which may result in excessive consumption of CPU 16 resources, cache controller 44 may undertake various page-level measures to ensure cache coherence, which are discussed in greater detail below, to ensure the requested cache line is not shared before accessing the line from main memory 36. Based on such page-level cache coherence measures, cache controller 44 may determine whether the page associated with the requested line is shared. If cache controller 44 determines that the page associated with the requested line is not shared, cache controller 44 may directly request the line from memory controller 34 via memory bus 48. If cache controller 44 determines that the page associated with the requested line is shared, cache controller 44 may follow the predetermined cache coherence protocol, (e.g., MSI, MESI, MOSI, MOESI protocols, etc.) to operate on the requested cache line.

Cache controller 44 may include page status table 50 to assist with the page-level cache coherence techniques noted above. Page status table 50 may track whether any lines from certain pages of memory are shared by other processor cores 40, enabling cache controller 44 to perform such page-level cache coherence techniques. Page status table 50 may take a variety of forms to serve a variety of page-level cache coherence functions. Particular embodiments are illustrated in FIGS. 4, 5, 9, and 14 below, which may enable certain techniques described in FIGS. 6-8, 10-13, 15, and 17-20.

In carrying out line-level or page-level cache coherence techniques, cache controller 44 may communicate with all or a subset of the other cache controllers 44 of CPU 16 using broadcasts known as snoop requests or snoop responses. Such broadcasts may take place via specialized hardware communication channels from one cache controller 44 to another or via memory bus 48. In certain embodiments, snoop requests and/or snoop responses may be "steered" only to certain other cache controllers 44, such as to cache controllers 44 of the same processor package 38 or different processor package 38, or to a cache controller 44 associated with a specific processor core 40. For example, if Core 0 requests a cache line that belongs to a page shared by Core 3, cache controller 44 associated with Core 0 may broadcast a snoop request only to cache controller 44 associated with Core 3. In response, cache controller 44 associated with Core 3 may determine whether Core 3 is still sharing the page and reply with a snoop response directly to cache controller 44 associated with Core 0.

Snooping hardware in CPU 16 may be integrated into cache controller 44 and may receive snoop requests. With such snooping hardware, cache controller 44 may snoop memory bus 48 for read or write requests by other cache controllers 44 for specific lines or, in certain embodiments disclosed herein, for pages associated with the specific lines. Snooping the memory bus 48 may involve reading all or part of a tag associated with a cache line for which a read or write request has been issued. In certain embodiments, as particularly illustrated in FIG. 15, the snooping hardware of cache controller 44 may read only a page address portion of the tag.

Depending on the particular configuration of page status table 50, many of which are described below with reference to FIGS. 4, 5, 9, and 14, page status table 50 may serve to reduce snoop traffic in CPU 16. In general, because page status table 50 may indicate whether a page is shared and/or where the page is shared, broadcasts of snoop requests to all other cache controllers 44 may be reduced or, in certain cases, eliminated. By way of example, as discussed in greater detail below, if page status table 50 indicates that a page is not shared, cache controller 44 may access a requested line from the page in main memory 36 without first broadcasting a snoop request and receiving snoop responses upon a cache miss.

FIG. 4 illustrates an embodiment of page status table 50 for cache controller 44 that may dynamically track whether any line from a number of tracked pages is shared by another cache memory 42. As such, page status table 50 may include a series of entries having page address bits 52 to represent the physical address of a tracked page of main memory, and status bit 54 to indicate whether any other cache controller 44 is currently sharing a line from the tracked page. In the embodiment of FIG. 4, page status table 50 may not track all pages of main memory 36, but rather only a subset of the pages of main memory 36. For example, page status table 50 may track only pages that hold cache lines currently stored in cache memory 42, or may track a predetermined number of recently-used pages. By way of example, page status table 50 may track the same number of pages as TLB 46, and may also track the same pages, employing the same replacement policy. Thus, page status table 50 may maintain only the most relevant entries by, for example, aging out the least recently used (LRU) table entry. Additional techniques for maintaining page status table 50 entries are discussed below with reference to FIGS. 16 and 17.

Page status table 50 may update status bit 54 to indicate whether a particular page is or is not shared after receiving an indication from other cache controller 44 that the page is or is not shared. For example, if cache controller 44 broadcasts a snoop request to all other cache controllers 44 regarding the page and at least one cache controller 44 sends a snoop response indicating the page is shared, cache controller 44 may cause page status table 50 to update the appropriate status bit 54 to indicate the page is shared. Similarly, if another cache controller 44 issues a snoop request regarding a page, implying that another cache memory 42 is sharing a line from the page, cache controller 44 may cause page status table 50 to update the corresponding status bit 54 accordingly.

When page status table 50 lists a particular page as shared, meaning that at least one other cache memory 42 is using a line from the page, cache controller 44 may follow the predetermined coherence protocol (e.g., MSI, MESI, etc.) when processor core 40 requests any line from the page. In following the predetermined coherence protocol, cache controller 44 may consume CPU 16 resources by broadcasting a snoop request to other cache controllers 44. However, when page status table 50 lists a particular page as not shared, meaning that no lines from the page are shared by any other cache memory 42, the predetermined coherence protocol may be bypassed. Specifically, when page status table 50 indicates a page is not shared and processor core 40 requests a line from the page, cache controller 44 may simply access the line in main memory 36 without broadcasting any snoop requests.

FIG. 5 illustrates an embodiment of page status table 50 for cache controller 44 that may track whether any line from a number of tracked pages is shared by another cache memory 42. In the embodiment of FIG. 5, page status table 50 may distinguish whether a page is shared by a cache controller 44 within the same processor package 38 or by a cache controller 44 in a different processor package 38. Thus, page status table 50 may include a series of table entries having page address bits 56 to represent the physical address of a tracked page of main memory, status bit 58 to indicate whether any other cache controller 44 in the same processor package 38 is currently sharing a line from the tracked page, and status bit 60 to indicate whether any other cache controller 44 in a different processor package 38 is currently sharing a line from the tracked page.

Like the embodiment of FIG. 4, the embodiment of page status table 50 of FIG. 5 may not track all pages of main memory 36, but rather only a subset of the pages of main memory 36. For example, page status table 50 may track only pages that hold cache lines currently stored in cache memory 42, or may track a predetermined number of recently-used pages. By way of example, page status table 50 may track the same number of pages as TLB 46, and may also track the same pages, employing the same replacement policy. Thus, page status table 50 may maintain only the most relevant entries by, for example, aging out the least recently used (LRU) table entry. Additional techniques for maintaining page status table 50 entries are discussed below with reference to FIGS. 16 and 17.

Figure 6:
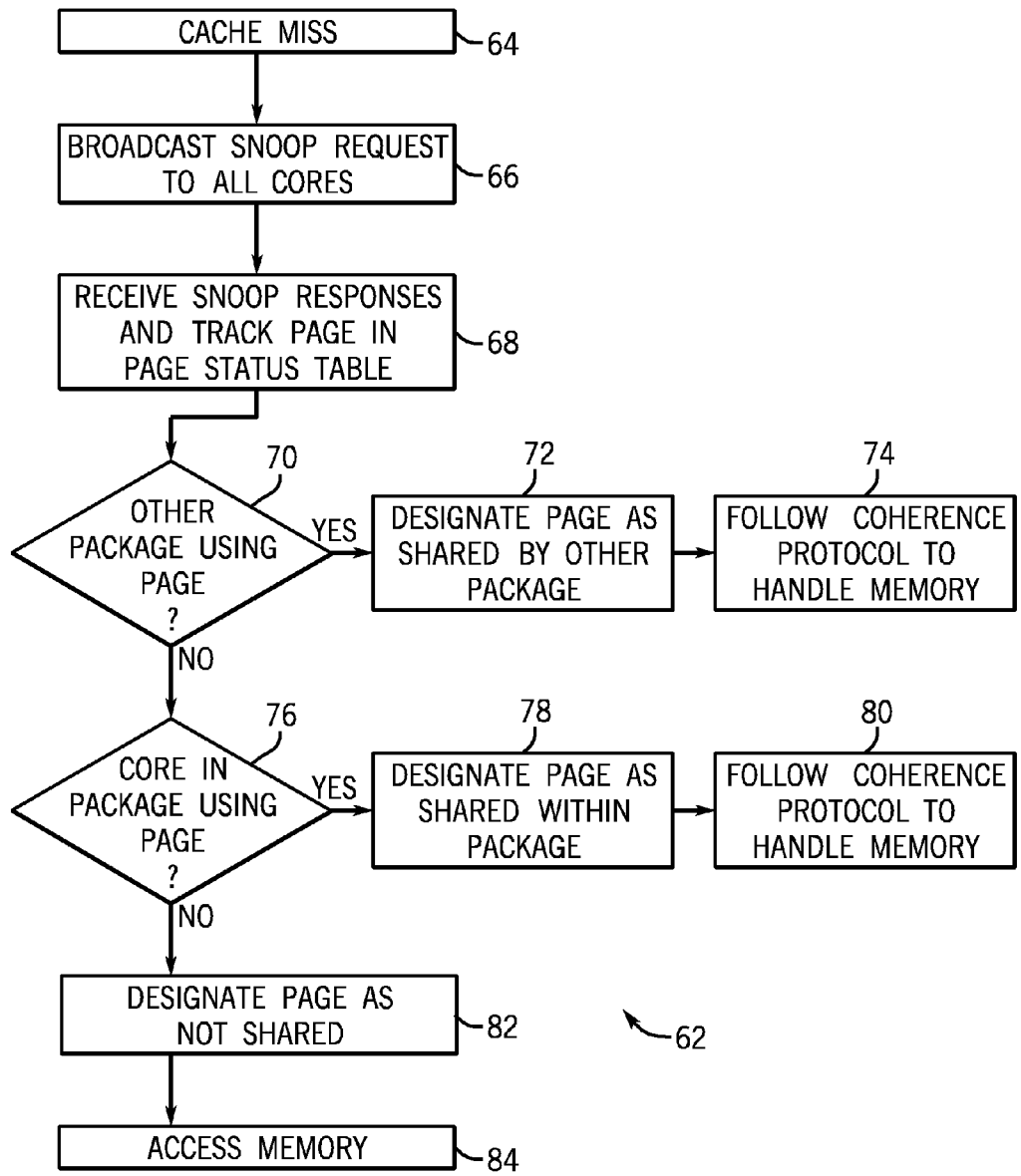
FIG. 6 is a flowchart describing a method of handling a cache miss when the page status table of FIG. 5 is not yet tracking a page, in accordance with aspects of the present disclosure.
Figure 7:
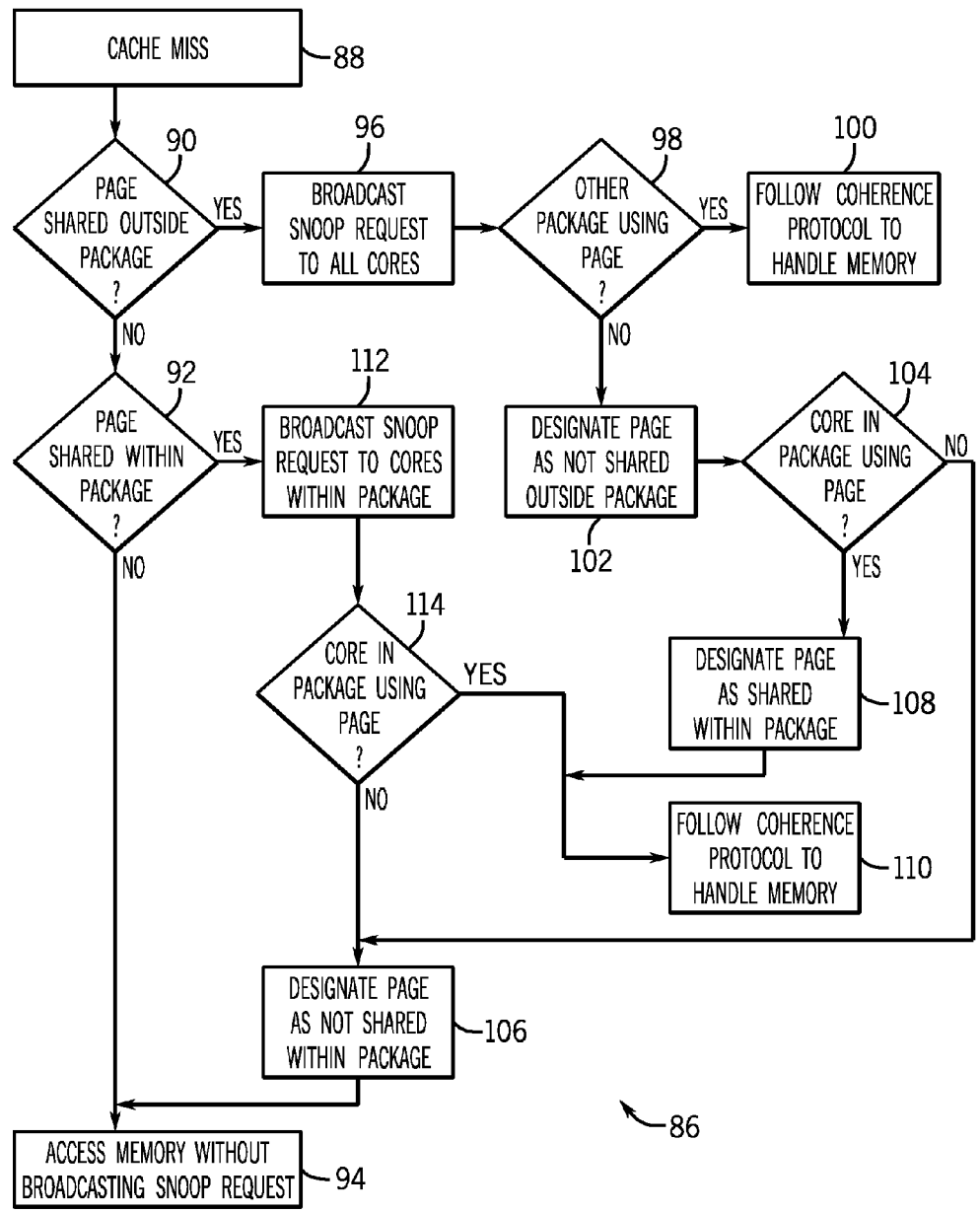
FIG. 7 is a flowchart describing a method of handling a cache miss when the page status table of FIG. 5 is already tracking a page, in accordance with aspects of the present disclosure.
Figure 8:
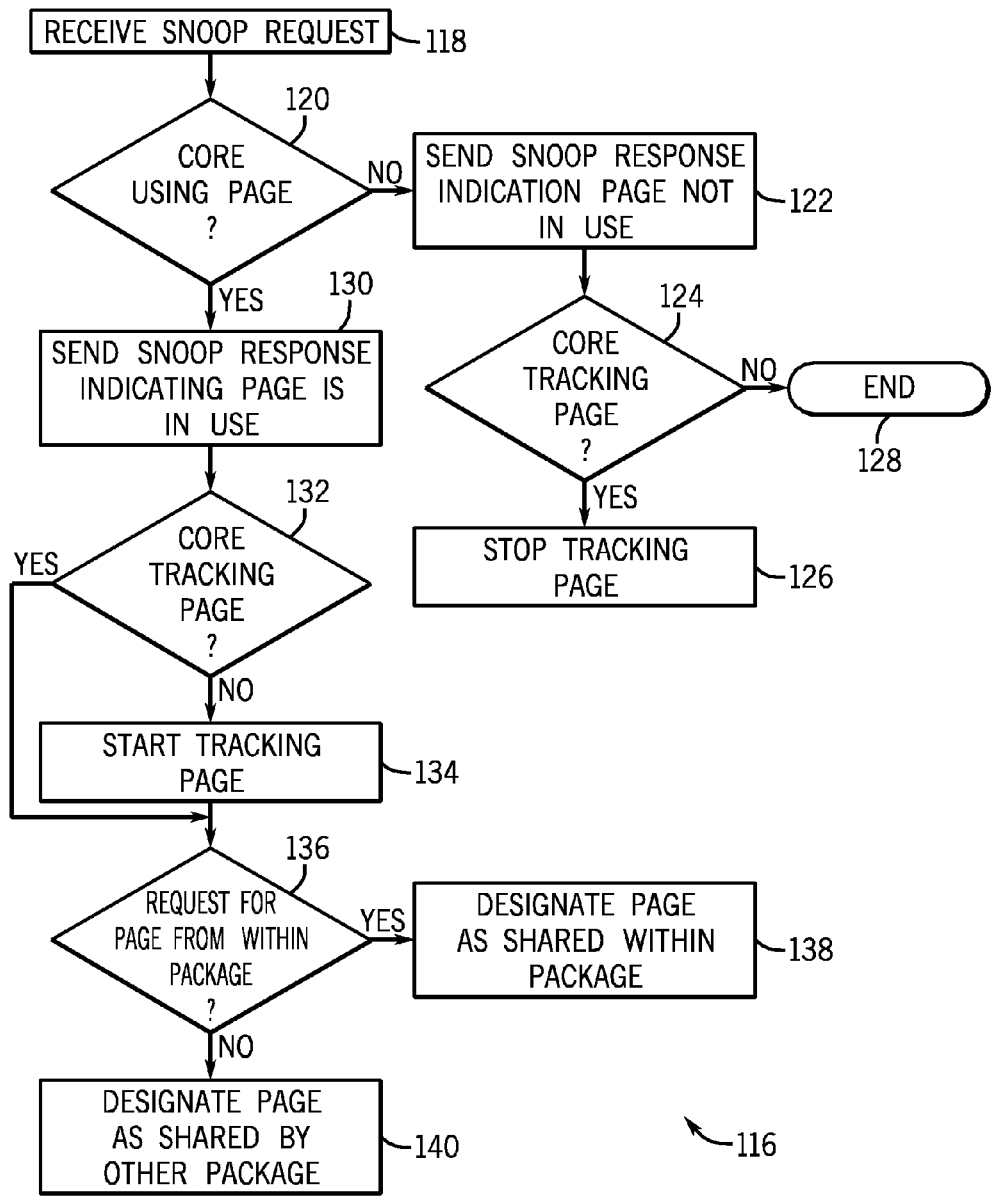
FIG. 8 is a flowchart describing a method of updating the page status table of FIG. 5, in accordance with aspects of the present disclosure.

FIGS. 6-8 are flowcharts illustrating cache coherence methods that cache controller 44 may employ in combination with the embodiment of page status table 50 shown in FIG. 5. Particularly, because the embodiment of page status table 50 of FIG. 5 may track whether any line from a page is currently in use by another cache memory 42 inside or outside the same processor package 38, broadcast snoop requests may be generally limited to certain relevant cache controllers 44. As such, FIG. 6 illustrates an initialization undertaken by cache controller 44 upon a cache miss when a requested page is not currently being tracked in page status table 50; FIG. 7 illustrates snoop filtering upon a cache miss to limit broadcasts among cache controllers 44 when a requested page is currently being tracked in page status table 50; and FIG. 8 illustrates a process of updating page status table 50 when cache controller 44 receives snoop requests from other cache controllers 44.

Turning to FIG. 6, flowchart 62 represents a manner in which cache controller 44 may handle a cache miss when page status table 50 is not yet tracking a page corresponding to a requested line. As noted above, flowchart 62 of FIG. 6 specifically relates to page-level cache coherence using the embodiment of page status table 50 of FIG. 5; however, other embodiments of page status table 50 may be used in conjunction with flowchart 62. Flowchart 62 begins with step 64, when processor 40 may issue a request to cache controller 44 for a cache line that is not stored in cache memory 42. When cache controller 44 determines that the cache line is not available locally in cache memory 42, a cache miss is deemed to occur. Since, as noted above, page status table 50 is not tracking the page from which the requested cache line is derived, cache controller 44 may proceed to broadcast a page-level snoop request to cache controllers 44 associated with all other processor cores 40 in step 66. The page-level snoop request may direct the receiving cache controllers 44 to determine whether any line from the requested page is being stored in the respective cache memory 42.

After broadcasting the page-level snoop request in step 66, the receiving cache controllers 44 may reply with page-level snoop responses in step 68. The snoop responses may generally indicate whether any line associated with the requested page is stored in another cache memory 42. Cache controller 44 may create a table entry for the requested page in page status table 50 and, based on the received snoop responses, cache controller 44 may designate whether the page is shared by the same or by another processor package 38.

In decision block 70, cache controller 44 may determine whether the page is shared by another processor package 38 other than that to which cache controller 44 belongs based on the received snoop responses. If the snoop responses indicate that any line from the requested page is shared by another processor package 38, in step 72, cache controller 44 may designate the page as shared by another processor package 44 by setting status bit 60 of page status table 50. Further, since the requested page is designated as being shared, there is a chance that the requested cache line is also being shared. As such, in step 74, cache controller 44 may follow the predetermined cache coherence protocol (e.g., MSI, MESI, etc.) to maintain line-level cache coherence. Among other things, following the predetermined protocol may involve broadcasting a line-level snoop request to all cache controllers 44.

If cache controller 44 determines, in decision block 70, that the requested page is not shared by another processor package 38, cache controller 44 may determine whether the page is shared within the same processor package 38 in decision block 76. If the snoop responses indicate that any line from the requested page is shared within the same processor package 38, in step 80, cache controller 44 may designate the page as shared within the same processor package 38 by setting status bit 58 of page status table 50. Further, since the requested page is designated as being shared, there is a chance that the requested cache line is also being shared. As such, in step 82, cache controller 44 may follow the predetermined cache coherence protocol (e.g., MSI, MESI, etc.) to maintain line-level cache coherence. Among other things, following the predetermined protocol may involve broadcasting a line-level snoop request to only cache controllers 44 within the same processor package 38.

If cache controller 44 determines, in decision block 76, that the requested page is not shared within the same processor package 38, cache controller 44 may designate the page as not shared by clearing status bits 58 and 60 of page status table 50 in step 82. Since the requested page is listed as not shared in page status table 50, no other cache memory 42 is sharing any line from the requested page. Thus, in step 84, cache controller 44 may access the line of memory requested by processor core 40 without any further broadcasts.

Flowchart 86 of FIG. 7 illustrates a manner of snoop filtering based on information stored in page status table 50 when page status table 50 is already tracking a page corresponding to a requested line. As noted above, flowchart 86 of FIG. 7 specifically relates to page-level cache coherence using the embodiment of page status table 50 of FIG. 5; however, other embodiments of page status table 50 may be used in conjunction with flowchart 86. Page status table 50 may already be tracking the page because a line corresponding to the page was previously requested by processor 40, as described above with reference to FIG. 6, or based on page-level snoop requests received from other cache controllers 44, as described below with reference to FIG. 8. Flowchart 86 may begin with step 88, when processor 40 may issue a request to cache controller 44 for a cache line that is not stored in cache memory 42. When cache controller 44 determines that the cache line is not available locally in cache memory 42, a cache miss is deemed to occur. Since, as noted above, page status table 50 is already tracking the page from which the requested cache line is derived, cache controller 44 may undertake a manner of snoop filtering based on information in page status table 50, and may thus avoid broadcasting unnecessary line-level snoop requests.

In decision block 90, cache controller 44 may determine whether status bit 60 of page status table 50 indicates the requested page is shared by another processor package 38. If the page is not shared by another processor package 38, in decision block 92, cache controller 44 may determine whether status bit 58 of page status table 50 indicates the requested page is also not shared within the same processor package 38. Since the requested page is not shared at all, no other cache memory 42 is sharing any line from the requested page. Thus, in step 94, cache controller 44 may access the line of memory requested by processor core 40 without broadcasting any snoop requests.

Returning to decision block 90, if status bit 60 instead indicates the requested page is shared by another cache memory 42 of a different processor package 38, cache controller 40 may broadcast a page-level snoop request to all other cache controllers 44 in step 96. The other cache controllers 44 may reply with snoop responses indicating whether any line from the requested page is shared. Next, in decision block 98, cache controller 44 may verify from the snoop responses that the requested page is still shared by another processor package 38. If the requested page is determined still to be shared by another processor package 38, in step 100, cache controller 44 may follow the predetermined cache coherence protocol (e.g., MSI, MESI, etc.) to maintain line-level cache coherence. Among other things, following the predetermined protocol may involve broadcasting a line-level snoop request to all cache controllers 44 of CPU 16.

If the requested page is determined no longer to be shared by another processor package 38 in decision block 98, status bit 60 of page status table 50 may be cleared in step 102. Next, in decision block 104, cache controller 44 may determine, based on the received snoop responses to the snoop requests of step 96, whether the requested page is being shared within the same processor package 38. If not, in step 106, status bit 58 of page status table 50 may be cleared. Since the requested page is not shared at all, no other cache memory 42 is sharing any line from the requested page. Thus, the process may flow to step 94, in which cache controller 44 may access the line of memory requested by processor core 40 without broadcasting any further snoop requests.

If, in decision block 104, the requested page is determined as not shared within the same processor package 38, in step 108, status bit 58 of page status table 50 may be set. Since the requested page is shared in another cache memory 42 within the same processor package 38, in step 110, cache controller 44 may follow the predetermined cache coherence protocol (e.g., MSI, MESI, etc.) to maintain line-level cache coherence. Among other things, following the predetermined protocol may involve broadcasting a line-level snoop request to all cache controllers 44 of CPU 16 or only to other cache controllers 44 within the same processor package 38.

Returning to decision block 92, if status bit 58 instead indicates the requested page is shared within the same processor package 38, cache controller 40 may broadcast a page-level snoop request only to other cache controllers 44 within the same processor package 38 in step 112. Since snoop requests are not sent to all other cache controllers 44, but rather only those within the same processor package 38, CPU 16 resources may be conserved. The other cache controllers 44 may reply with snoop responses indicating whether any line from the requested page is shared in the respective cache memory 42. Next, in decision block 114, cache controller 44 may verify from the snoop responses that the requested page is still shared within the same processor package 38.

If the requested page is determined still to be shared within the same processor package 38, in step 110, cache controller 44 may follow the predetermined cache coherence protocol (e.g., MSI, MESI, etc.) to maintain line-level cache coherence. Among other things, following the predetermined protocol may involve broadcasting a line-level snoop request to all cache controllers 44 of CPU 16 or only to other cache controllers 44 within the same processor package 38. If the requested page is determined no longer to be shared within the same processor package 38, in step 106, status bit 58 of page status table 50 may be cleared. Since the requested page is not shared at all, no other cache memory 42 is sharing any line from the requested page. Thus, the process may flow to step 94, in which cache controller 44 may access the line of memory requested by processor core 40 without broadcasting any further snoop requests.

Turning to FIG. 8, flowchart 116 illustrates a manner of updating page status table 50 to reflect whether a page is tracked and/or whether such tracked pages are shared. As noted above, flowchart 116 of FIG. 8 specifically relates to page-level cache coherence using the embodiment of page status table 50 of FIG. 5; however, other embodiments of page status table 50 may be used in conjunction with flowchart 116. Flowchart 116 may begin with step 118 when cache controller 44 receives a page-level snoop request from another cache controller 44. The page-level snoop request may direct cache controller 44 to check, in decision block 120, whether any line associated with a requested page is currently stored in cache memory 42. If cache controller 44 determines that no cache lines in cache memory 42 belong to the requested page, cache controller 44 may send a snoop response indicating the page is not shared by cache memory 42 in step 122. Additionally, cache controller 44 may determine whether page status table 50 is currently tracking the page in decision block 124. Since cache controller 44 determined in decision block 120 that no lines from the page are currently stored in cache memory 42, if page status table 50 is currently tracking the page, page status table 50 may stop tracking the page in step 126. Doing so may conserve available entries in page status table 50. If cache controller 44 instead determines, in decision block 124, that page status table 50 is not tracking the page, flowchart 116 may end at numeral 128.

Returning to decision block 120, if, after receiving the page-level snoop request from the other cache controller 44, cache controller 44 determines that cache memory 42 does include at least one line from the requested page, cache controller 44 may reply with a snoop response indicating the page is shared. Additionally, cache controller 44 may consider whether page status table 50 is currently tracking the page in decision block 132. Since the page-level snoop request received in step 118 indicates that the another cache memory 42 is also storing at least one line from the requested page, if page status table 50 is not already tracking the page, page status table 50 may begin tracking the page in step 126 by creating a new page status table 50 entry. Doing so may conserve available entries in page status table 50 by tracking a page with a line in cache memory 42 that is known to be shared by another cache memory 42 elsewhere in CPU 16. If cache controller 44 instead determines, in decision block 132, that page status table 50 is already tracking the page, flowchart 116 may continue to decision block 136.

In decision block 136, cache controller 44 may consider whether the page-level snoop request received in step 118 was sent by another cache controller 44 within the same processor package 38 or by another cache controller 44 in a different processor package 38. If the page-level snoop request was sent from within the same processor package 38 as cache controller 44, cache controller 44 may set status bit 58 of page status table 50. If the page-level snoop request was sent from a different processor package 38, cache controller 44 may instead set status bit 60 of page status table 50. Thus, flowchart 116 of FIG. 8 may enable page status table 50 to maintain which pages may be shared based on received page-level snoop requests.

FIG. 9 illustrates another embodiment of page status table 50 for cache controller 44 that may track whether any line from a number of tracked pages is shared by another cache memory 42. In the embodiment of FIG. 9, page status table 50 may distinguish with which processor core 40 a page is shared. Thus, when used in conjunction with the embodiment of CPU 16 illustrated in FIG. 3, page status table 50 may include a series of table entries having page address bits 142 to represent the physical address of a tracked page of main memory, status bit 144 to indicate whether Core 0 is currently sharing a line from the tracked page, status bit 146 to indicate whether Core 1 is currently sharing a line from the tracked page, status bit 148 to indicate whether Core 2 is currently sharing a line from the tracked page, and status bit 150 to indicate whether Core 3 is currently sharing a line from the tracked page. The embodiment of page status table 50 of FIG. 9 may include more or fewer page table entries depending on the number of processor cores 40 in CPU 16. Additionally, in certain embodiments, page status table 50 may include only entries relating to other processor cores 40. For example, page status table 50 associated with Core 0 may include only status bits 146, 148, and 150, which may correspond to the other processor cores 40 that may be sharing any line from a tracked page of memory.

Like the embodiment of FIGS. 4 and 5, the embodiment of page status table 50 of FIG. 9 may not track all pages of main memory 36, but rather only a subset of the pages of main memory 36. For example, page status table 50 may track only pages that hold cache lines currently stored in cache memory 42, or may track a predetermined number of recently-used pages. By way of example, page status table 50 may track the same number of pages as TLB 46, and may also track the same pages, employing the same replacement policy. Thus, page status table 50 may maintain only the most relevant entries by, for example, aging out the least recently used (LRU) table entry. Additional techniques for maintaining page status table 50 entries are discussed below with reference to FIGS. 16 and 17.

Figure 10:
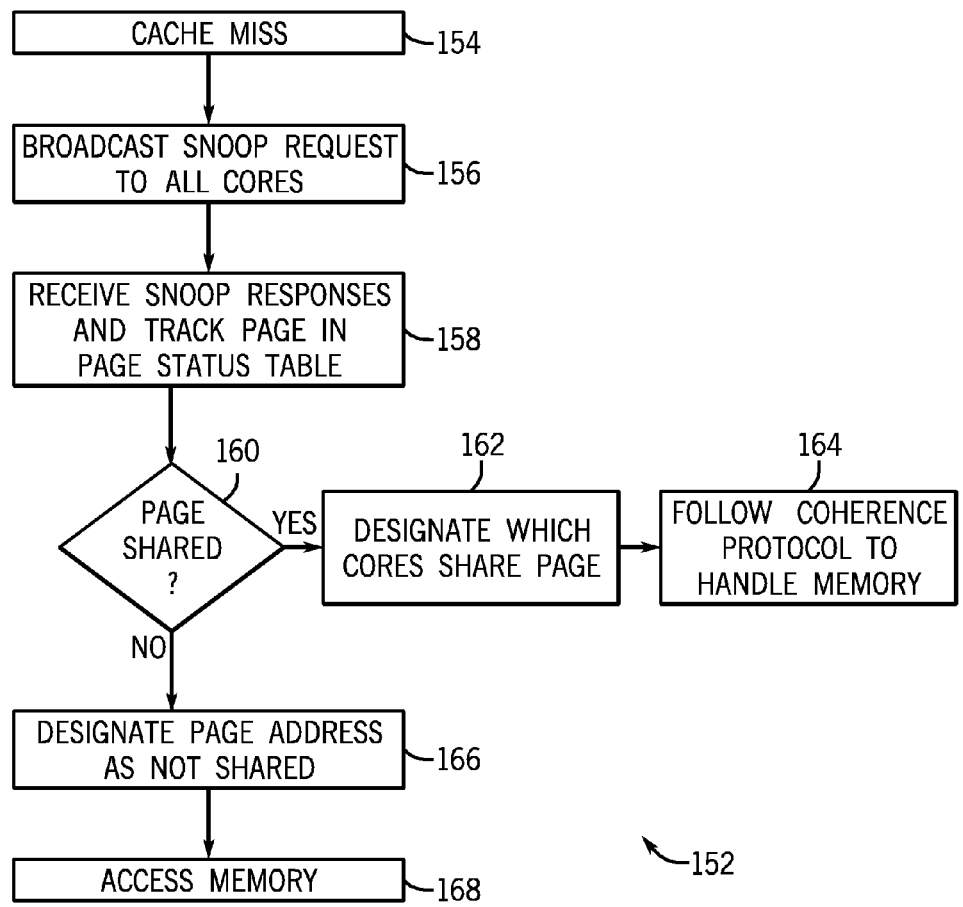
FIG. 10 is a flowchart describing a method of handling a cache miss when the page status table of FIG. 9 is not yet tracking a page, in accordance with aspects of the present disclosure.
Figure 11:
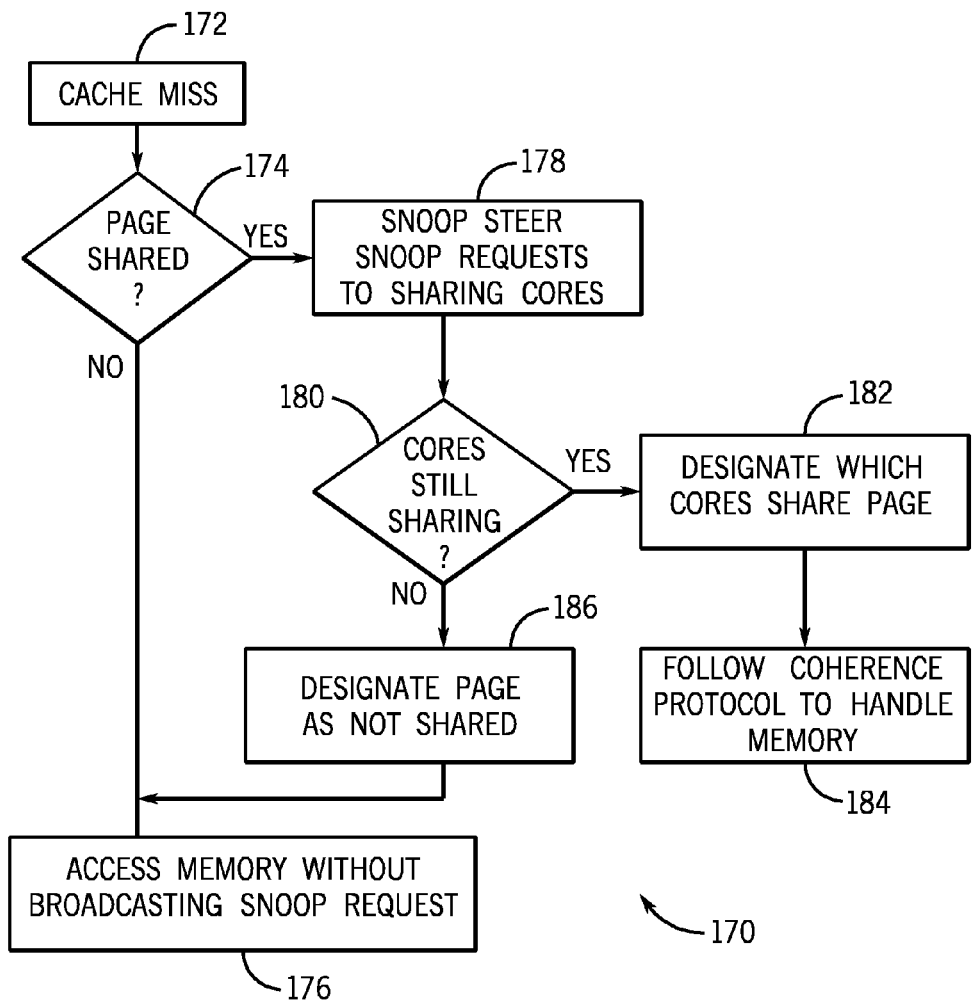
FIG. 11 is a flowchart describing a method of handling a cache miss when the page status table of FIG. 9 is already tracking a page, in accordance with aspects of the present disclosure.
Figure 12:
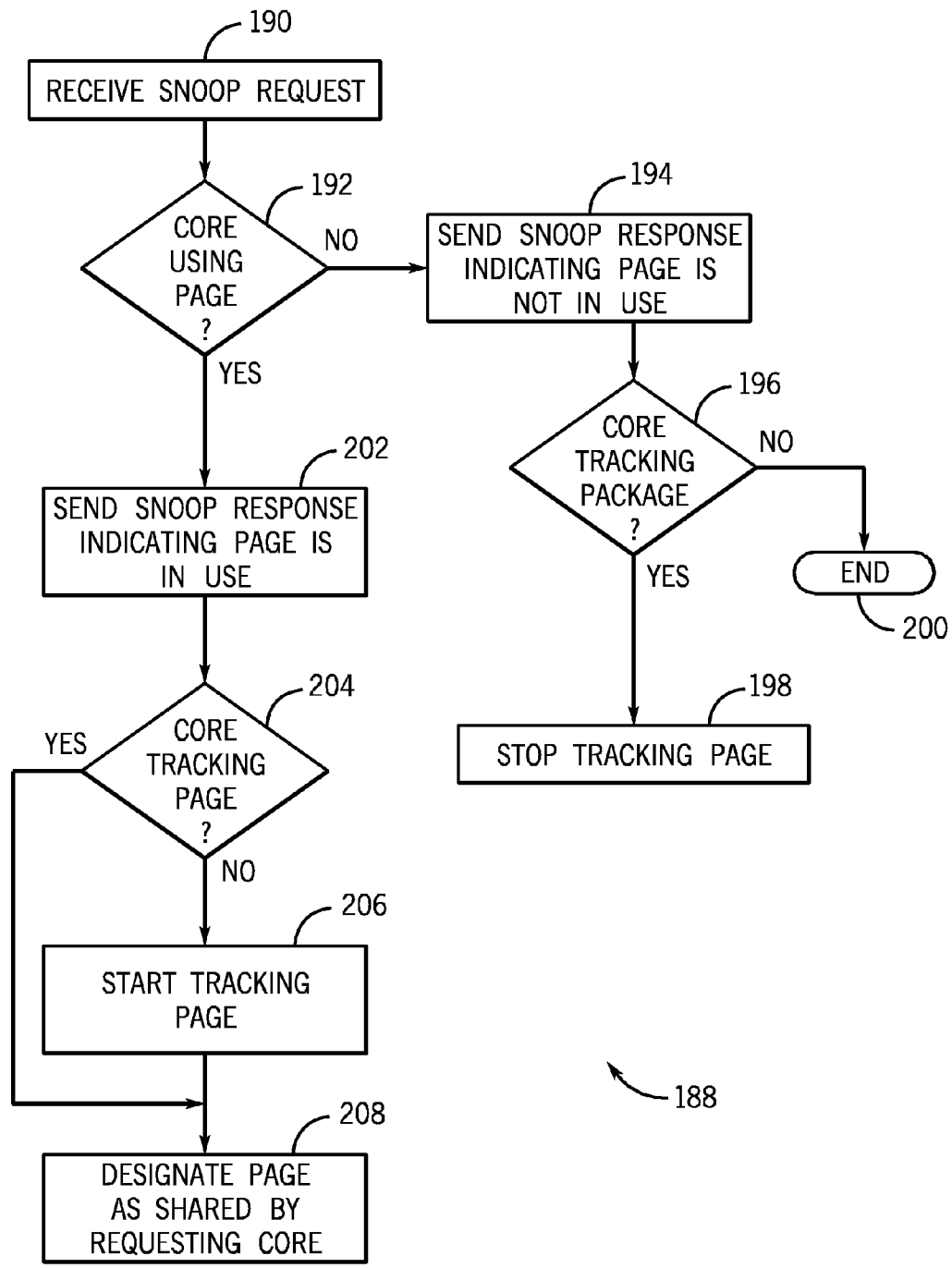
FIG. 12 is a flowchart describing a method of updating the page status table of FIG. 9, in accordance with aspects of the present disclosure.
Figure 13:
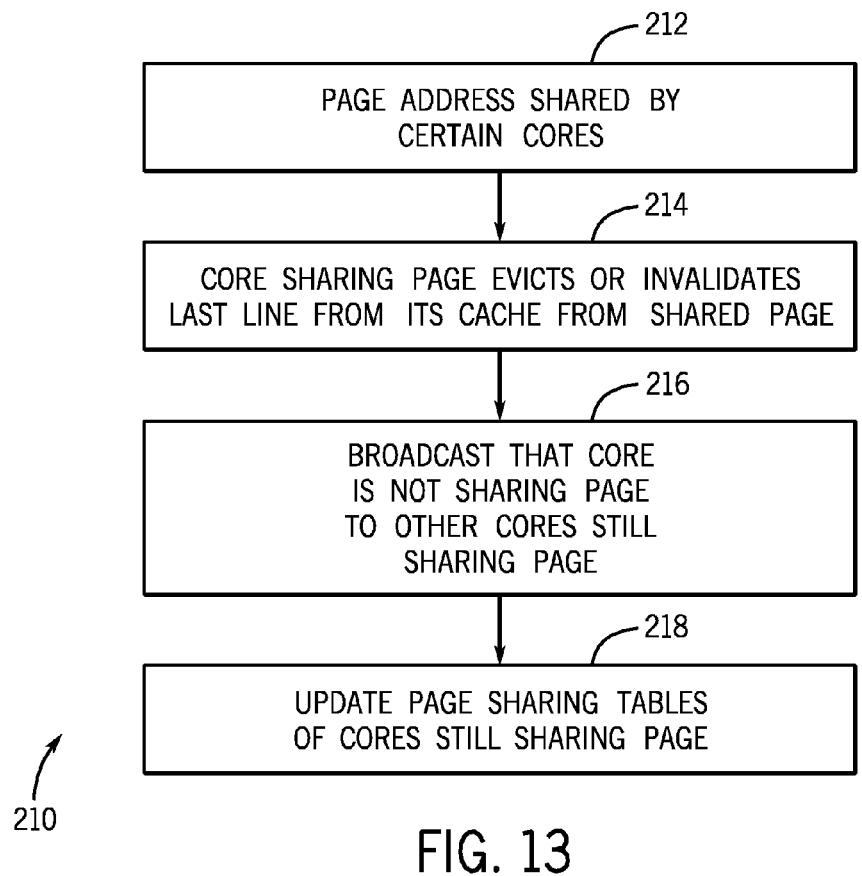
FIG. 13 is a flowchart describing another method of updating the page status table of FIG. 9, in accordance with aspects of the present disclosure.

FIGS. 10-13 are flowcharts illustrating cache coherence methods that cache controller 44 may employ in combination with the embodiment of page status table 50 shown in FIG. 9. Particularly, because the embodiment of page status table 50 of FIG. 9 may track which processor cores 40 are currently sharing a page, broadcast snoop requests may be generally limited to certain relevant cache controllers 44 associated with the sharing processor cores 40. As such, FIG. 10 illustrates an initialization undertaken by cache controller 44 upon a cache miss when a requested page is not currently being tracked in page status table 50; FIG. 11 illustrates snoop filtering upon a cache miss to limit broadcasts among cache controllers 44 when a requested page is currently being tracked in page status table 50; FIG. 12 illustrates a process of updating page status table 50 when cache controller 44 receives snoop requests from other cache controllers 44; and FIG. 13 illustrates a process of updating page status table 50 when cache controller 44 is no longer sharing a tracked page.

Turning to FIG. 10, flowchart 152 represents a manner in which cache controller 44 may handle a cache miss when page status table 50 is not yet tracking a page corresponding to a requested line. As noted above, flowchart 152 of FIG. 10 specifically relates to page-level cache coherence using the embodiment of page status table 50 of FIG. 9; however, other embodiments of page status table 50 may be used in conjunction with flowchart 152. Flowchart 152 begins with step 154, when processor 40 may issue a request to cache controller 44 for a cache line that is not stored in cache memory 42. When cache controller 44 determines that the cache line is not available locally in cache memory 42, a cache miss is deemed to occur. Since, as noted above, page status table 50 is not yet tracking the page from which the requested cache line is derived, cache controller 44 may proceed to broadcast a page-level snoop request to cache controllers 44 associated with all other processor cores 40 in step 156. The page-level snoop request may direct the receiving cache controllers 44 to determine whether any line from the requested page is being stored in the respective cache memory 42.

After broadcasting the page-level snoop request in step 156, the receiving cache controllers 44 may reply with page-level snoop responses in step 158. The page-level snoop responses may generally indicate whether any line associated with the requested page is stored in another cache memory 42. Cache controller 44 may create a table entry for the requested page in page status table 50 and, based on the received snoop responses, cache controller 44 may designate whether the page is shared and if so, by which processor core 40 the page is shared in the steps that follow.

Specifically, in decision block 160, cache controller 44 may determine with which other processor cores 40 the page is shared based on the received snoop responses. If the snoop responses indicate that any line from the requested page is shared by another processor core 40, in step 162, cache controller 44 may designate the page as shared by the other processor core 40 by setting the corresponding status bit 144, 146, 148, or 150 of page status table 50. Further, since the requested page is designated as being shared, there is a chance that the requested cache line is also being shared. As such, in step 164, cache controller 44 may follow the predetermined cache coherence protocol (e.g., MSI, MESI, etc.) to maintain line-level cache coherence. Among other things, following the predetermined protocol may involve broadcasting a line-level snoop request to all cache controllers 44 or only to the cache controller 44 associated with the processor core 40 designated as sharing the requested page in page status table 50.

If cache controller 44 determines, in decision block 160, that the requested page is not shared, cache controller 44 may designate the page as not shared by clearing status bits 144, 146, 148, and 150 of page status table 50 in step 166. Since the requested page is listed as not shared in page status table 50, no other cache memory 42 is sharing any line from the requested page. Thus, in step 168, cache controller 44 may access the line of memory requested by processor core 40 without any further broadcasts.

Flowchart 170 of FIG. 11 illustrates a manner of snoop filtering based on information stored in page status table 50 when page status table 50 is already tracking a page corresponding to a requested line. As noted above, FIG. 11 specifically relates to page-level cache coherence using the embodiment of page status table 50 of FIG. 9; however, other embodiments of page status table 50 may be used in conjunction with flowchart 170. Page status table 50 may already be tracking the page because a line corresponding to the page was previously requested by processor 40, as described above with reference to FIG. 10, or based on page-level snoop requests received from other cache controllers 44, as described below with reference to FIG. 12. Flowchart 170 may begin with step 172, when processor 40 may issue a request to cache controller 44 for a cache line that is not stored in cache memory 42. When cache controller 44 determines that the cache line is not available locally in cache memory 42, a cache miss is deemed to occur. Since, as noted above, page status table 50 is already tracking the page from which the requested cache line is derived, cache controller 44 may undertake a manner of snoop filtering based on information in page status table 50, and may thus avoid broadcasting unnecessary line-level snoop requests.

In decision block 174, cache controller 44 may determine whether any status bits 144, 146, 148, or 150 of page status table 50 indicate that the requested page is shared by another processor core 40. If the page is not shared by another processor core 40, no other cache memory 42 is sharing any line from the requested page. Thus, in step 176, cache controller 44 may access the line of memory requested by processor core 40 without broadcasting any snoop requests.

Returning to decision block 174, if any of status bits 144, 146, 148, or 150 instead indicate the requested page is shared by another processor core 40, cache controller 44 may broadcast a page-level snoop request to only those other cache controllers 44 sharing the page, as shown by step 178. As noted in FIG. 11, broadcasting page-level snoop requests only to cache controllers 44 whose processor cores 40 are listed as sharing the page in page status table 50 may be termed "snoop steering," and may thus reduce unnecessary snoop traffic to processor cores 40 that are not sharing the page. The other cache controllers 44 may reply with snoop responses indicating whether any line from the requested page is shared. For example, if page status table 50 of Core 0 indicates that Core 1 and Core 3 currently share a line from the requested page, cache controller 44 of Core 0 may send page-level snoop requests only to Core 1 and Core 3.

In decision block 180, cache controller 44 may verify from the snoop responses that the requested page is still shared by the other processor cores 40. If the requested page is determined still to be shared by any of the other processor cores 40 that received page-level snoop requests, in step 182, cache controller 44 may update page status table 50 to reflect which processor cores 40 continue to share the requested page. To continue with the example above, cache controller 44 of Core 1 may send a page-level snoop response to cache controller 44 of Core 0 indicating no lines from the requested page are shared in cache memory 42 of Core 1, and cache controller 44 of Core 3 may send a page-level snoop response that at least one line from the requested page is shared in cache memory 42 of Core 3. Thus, page status table 50 of Core 0 may clear status bit 146 while keeping status bit 150 set. Finally, cache controller 44 may follow the predetermined cache coherence protocol (e.g., MSI, MESI, etc.) to maintain line-level cache coherence. Among other things, following the predetermined protocol may involve broadcasting a line-level snoop request only to those other cache controllers 44 that page status table 50 lists as sharing the page.

If the requested page is determined in decision block 180 no longer to be shared by any other processor core 40, status bits 144, 146, 148, and 150 of page status table 50 may be cleared in step 186. Since the requested page is not shared at all, no other cache memory 42 is sharing any line from the requested page. Thus, the process may flow to step 176, in which cache controller 44 may access the line of memory requested by processor core 40 without broadcasting any further snoop requests.

Turning to FIG. 12, flowchart 188 illustrates a manner of updating page status table 50 to reflect whether a page is tracked and/or whether such tracked pages are shared. As noted above, FIG. 12 specifically relates to page-level cache coherence using the embodiment of page status table 50 of FIG. 9; however, other embodiments of page status table 50 may be used in conjunction with flowchart 188. Flowchart 188 may begin with step 190 when cache controller 44 receives a page-level snoop request from another cache controller 44. The page-level snoop request may direct cache controller 44 to check, in decision block 192, whether any line associated with a requested page is currently stored in cache memory 42. If cache controller 44 determines that no cache lines in cache memory 42 belong to the requested page, cache controller 44 may send a snoop response indicating the page is not shared by cache memory 42 in step 194. Additionally, cache controller 44 may determine whether page status table 50 is currently tracking the page in decision block 196. Since cache controller 44 determined in decision block 192 that no lines from the page are currently stored in cache memory 42, if page status table 50 is currently tracking the page, page status table 50 may stop tracking the page in step 198. Doing so may conserve available entries in page status table 50. If cache controller 44 instead determines, in decision block 196, that page status table 50 is not tracking the page, flowchart 188 may end at numeral 200.

Returning to decision block 192, if, after receiving the page-level snoop request from the other cache controller 44, cache controller 44 determines that cache memory 42 does include at least one line from the requested page, cache controller 44 may reply with a snoop response indicating the page is shared in step 202. Additionally, cache controller 44 may consider whether page status table 50 is currently tracking the page in decision block 204. Since the page-level snoop request received in step 190 indicates that the another cache memory 42 is also storing at least one line from the requested page, if page status table 50 is not already tracking the page, page status table 50 may begin tracking the page in step 206 by creating a new page status table 50 entry. Doing so may conserve available entries in page status table 50 by tracking a page with a line in cache memory 42 that is known to be shared by another cache memory 42 elsewhere in CPU 16. If cache controller 44 instead determines, in decision block 204, that page status table 50 is already tracking the page, flowchart 188 may continue to step 208. In step 208, cache controller 44 may set status bit 144, 146, 148, or 150 of page status table 50, depending on which cache controller 44 sent the page-level snoop request of step 190.

Flowchart 210 of FIG. 13 illustrates another manner of updating page status table 50 to track relevant shared page addresses. As noted above, FIG. 13 specifically relates to page-level cache coherence using the embodiment of page status table 50 of FIG. 9; however, other embodiments of page status table 50 may be used in conjunction with flowchart 210 of FIG. 13. Flowchart 210 may begin with step 212, when cache memory 42 associated with a first processor core 40 (e.g., Core 0) stores a single line from a page tracked in page status table 50 as shared by at least one other cache memory 42 associated with another processor core 40 (e.g., Core 3). In step 214, cache memory 42 associated with the first processor core 40 (e.g., Core 0) may evict or invalidate the cache line belonging to the tracked page. Since the evicted or invalidated cache line was the last cache line belonging to the tracked page, cache memory 42 associated with the first processor core 40 (e.g., Core 0) may no longer store any lines from the tracked page.

In step 216, cache controller 44 associated with the first processor core 40 (e.g., Core 0) may broadcast a message to all other cache controllers 44 listed in page status table 50 as sharing the tracked page (e.g., Core 3). The broadcast of step 216 may indicate that cache memory 42 associated with the first processor core 40 (e.g., Core 0) no longer stores any line from the tracked page. As such, in step 218, cache controllers 44 that received the broadcast of step 216 (e.g., Core 3) may update their respective page status tables 50 to indicate that the first processor core 40 no longer shares the tracked page.

FIG. 14 illustrates another embodiment of page status table 50 for cache controller 44 that may track whether any line from a number of tracked pages is shared by another cache memory 42. In the embodiment of FIG. 14, like the embodiment of FIG. 9, page status table 50 may distinguish with which processor core 40 a page is shared. Further, page status table 50 of FIG. 14 may additionally track a type of access to each page that each processor core 40 may have. Thus, when used in conjunction with the embodiment of CPU 16 illustrated in FIG. 3, page status table 50 may include a series of table entries having page address bits 220 to represent the physical address of a tracked page of main memory and status bits 222, 224, 226, and 228 to indicate whether each processor core 40 may share at least one line from the tracked page and, if so, a type of access to the page. For example, a type of access to a tracked page may be read-write, read-only, or no-access. Alternatively, the type of access to the page may be based on the predetermined cache coherence protocol (e.g., MSI, MESI, etc.). For example, if page status table 50 tracks a page having a cache line held by Core 0 as "Exclusive" under the MESI protocol, status bits 222 in page status table 50 may indicate the page as exclusive to Core 0.

The embodiment of page status table 50 of FIG. 14 may include more or fewer page table entries depending on the number of processor cores 40 in CPU 16. Additionally, in certain embodiments, page status table 50 may include only entries relating to other processor cores 40. For example, page status table 50 associated with Core 0 may include only status bits 224, 226, and 228.

Like the embodiments of FIGS. 4, 5, and 9, the embodiment of page status table 50 of FIG. 14 may not track all pages of main memory 36, but rather only a subset of the pages of main memory 36. For example, page status table 50 may track only pages that hold cache lines currently stored in cache memory 42, or may track a predetermined number of recently-used pages. By way of example, page status table 50 may track the same number of pages as TLB 46, and may also track the same pages, employing the same replacement policy. Thus, page status table 50 may maintain only the most relevant entries by, for example, aging out the least recently used (LRU) table entry. Additional techniques for maintaining page status table 50 entries are discussed below with reference to FIGS. 16 and 17.

Figure 15:
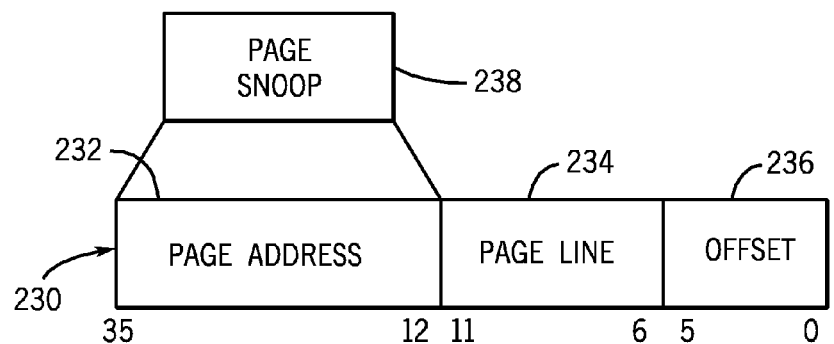
FIG. 15 is a block diagram illustrating schematically a manner of performing a page snoop procedure in the central processing unit of FIG. 3, in accordance with aspects of the present disclosure.

FIG. 15 is a block diagram illustrating a manner of page-level snooping that may simplify hardware configurations used to carry out the page-level cache coherence techniques described herein. As noted above with reference to FIG. 3, cache controller 44 may include memory bus snooping circuitry which may snoop memory bus 48 for certain memory accesses by other cache controllers 44. FIG. 15 illustrates cache tag 230 associated with a single cache line of memory. Cache tag 230 may include a number of bits including page address bits 232, page line bits 234, and offset bits 236. Page address bits 232 may designate the page associated with cache tag 230, and may typically occupy a portion of most significant bits of cache tag 230, shown in FIG. 15 as including bits 12-35. Page line bits 234 may designate the line of the page associated with cache tag 230 (e.g., line 0, 1, . . . 63, etc.), and may typically occupy a portion of bits immediately preceding page address bits 232. In FIG. 15, page line bits 234 occupy bits 6-11, sufficient to distinguish between 64 lines per page. Offset bits 236 may designate the number of bits offset from the start of the data of the cache line data where desired memory data begins. In FIG. 15, offset bits 236 occupy bits 0-5, sufficient to distinguish between 32 bits of data. However, it should be appreciated that page address bits 232, page line bits 234, and offset bits 236 may vary depending on particular hardware design objectives.

As illustrated in FIG. 15, page-level snooping circuitry 238 may snoop only page address bits 232 on memory bus 48, rather than snoop both page address bits 232 and line address bits 234, as may be done by line-level snooping circuitry in CPU 16. With page-level snoop circuitry 238, cache controller 44 may readily assess whether another cache controller 44 of CPU 16 is seeking access to a page. Additionally, because only page address bits 232 need be snooped by page-level snooping circuitry 238, such hardware may involve fewer interconnections and may take up less space in CPU 16. Alternatively, page-level snooping circuitry 238 may be integrated with line-level snooping circuitry that may snoop both page address bits 232 and page line bits 234; however, extraneous page line bits 234 read by line-level snooping circuitry may be ignored to carry out page-level snooping.

Figure 16:
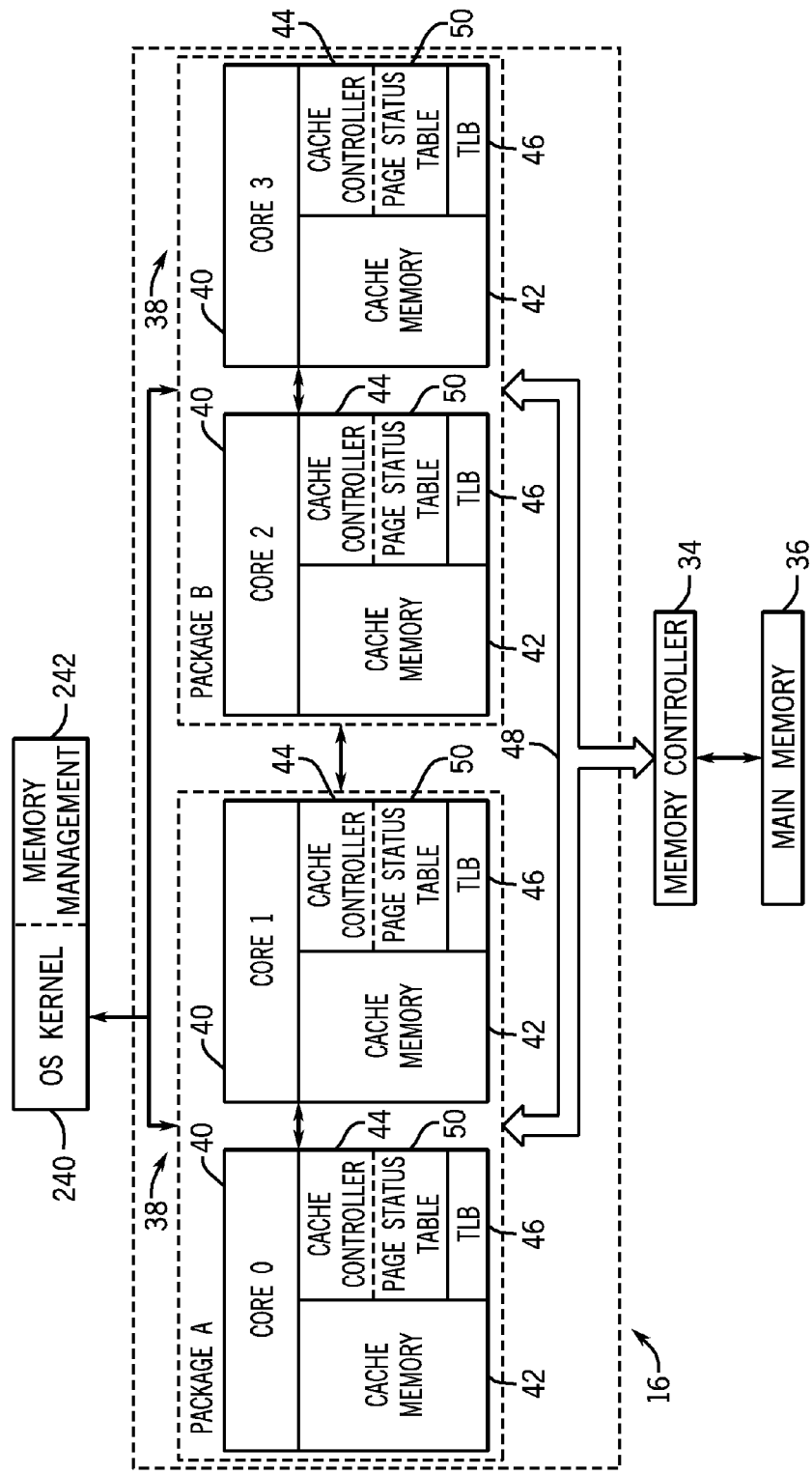
FIG. 16 is a block diagram illustrating an embodiment of a central processing unit of the electronic device of FIG. 1 having cache memory management hardware to communicate with an operating system kernel, in accordance with aspects of the present disclosure.

FIG. 16 illustrates an embodiment of CPU 16 capable of employing additional cache memory management techniques. The embodiment of CPU 16 of FIG. 16 may generally include the same hardware components as the embodiment of FIG. 3 and, as such, the discussion of such hardware components is not reproduced. However, the embodiment of CPU 16 of FIG. 16 may additionally receive information from operating system (OS) kernel 240 running on CPU 16 to perform further cache memory management techniques, as illustrated below with reference to FIGS. 17-20. Specifically, memory management software 242 of OS kernel 242 may allocate, deallocate, map, and unmap pages of memory in software. Such events may be communicated to cache memory management hardware in CPU 16, where such hardware may undertake various measures in response to the memory management software 242 events.

Figure 17:
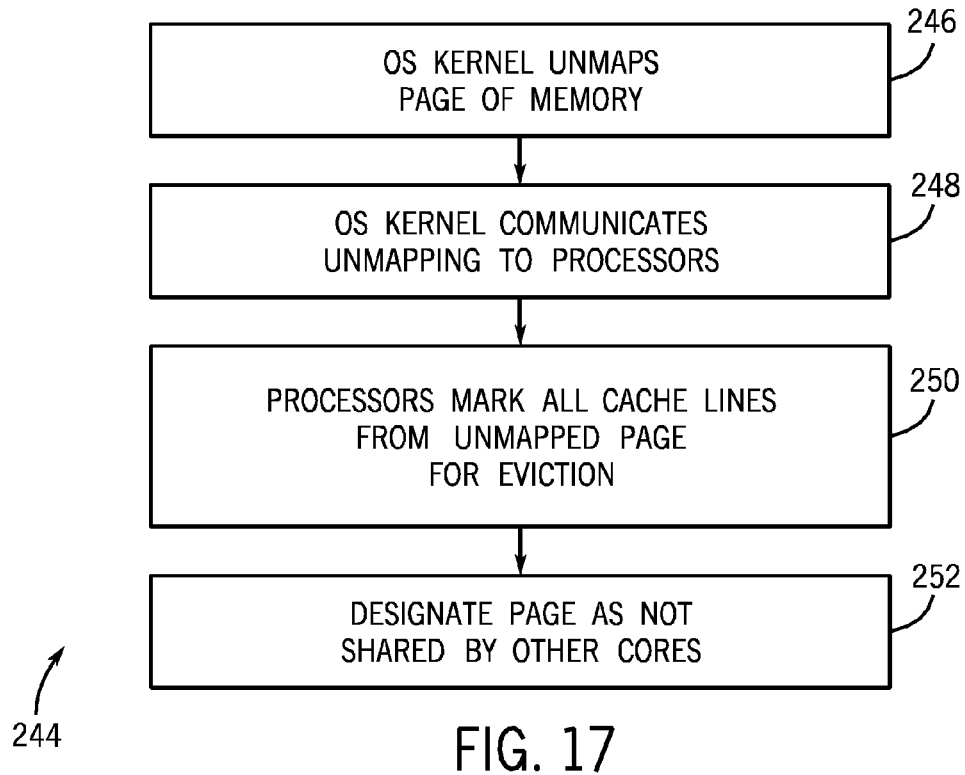
FIG. 17 is a flowchart describing a method of cache memory management when an operating system kernel unmaps a page of memory, in accordance with aspects of the present disclosure.

Particularly, flowchart 244 of FIG. 17 describes a manner of hardware cache memory management when memory management software 242 of OS kernel 240 unmaps a page of memory. Flowchart 244 may begin with step 246, when memory management software 242 of OS kernel 240 unmaps a page of memory. In step 248, OS kernel 240 may communicate the event to CPU 16. Because the page of memory has been unmapped, cache lines from the unmapped page may no longer be of use. Thus, in step 250, cache memory 42 may evict or mark for eviction all cache lines associated with the unmapped page. Further, in step 252, page status table 50 may designate the unmapped page address as not shared. Alternatively, page status table 50 may stop tracking the unmapped page address.

Figure 18:
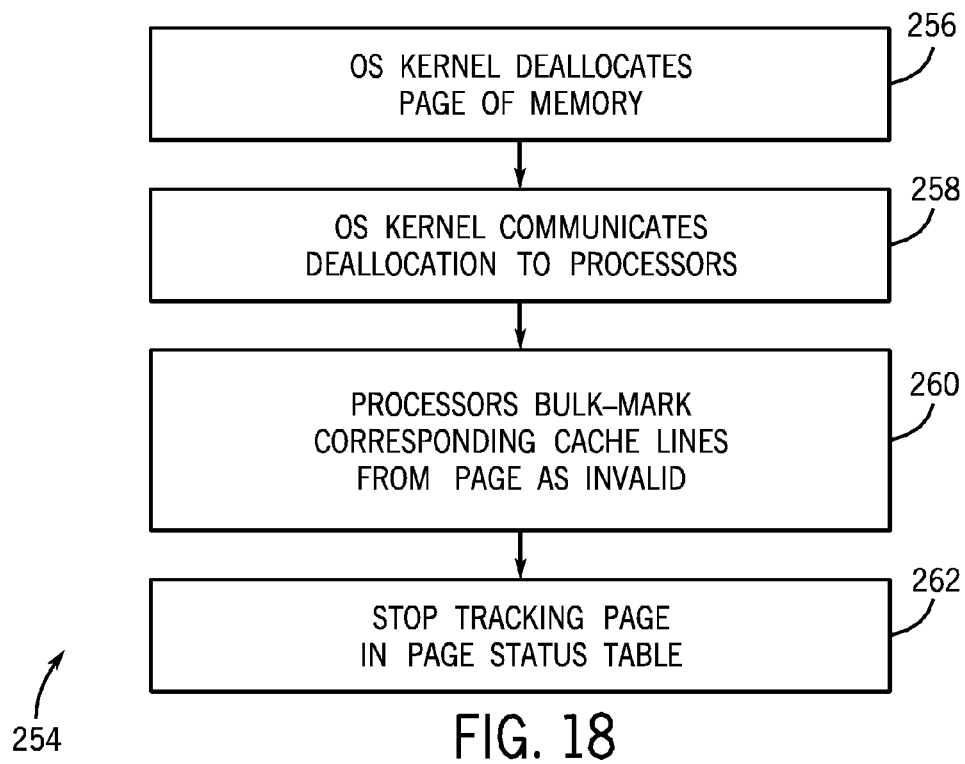
FIG. 18 is a flowchart describing a method of cache memory management when an operating system kernel deallocates a page of memory, in accordance with aspects of the present disclosure.

Flowchart 254 of FIG. 18 describes a manner of hardware cache memory management when memory management software 242 of OS kernel 240 deallocates a page of memory. Flowchart 254 may begin with step 256, when memory management software 242 of OS kernel 240 deallocates a page of memory out of software. In step 258, OS kernel 240 may communicate the event to CPU 16. Because the page of memory has been deallocated, cache lines from the deallocated page may no longer be valid. Thus, in step 260, depending on the predetermined cache coherence protocol (e.g., MSI, MESI), cache memory 42 may mark as invalid all cache lines associated with the deallocated page. Further, in step 262, page status table 50 may stop tracking the deallocated page address.

Figure 19:
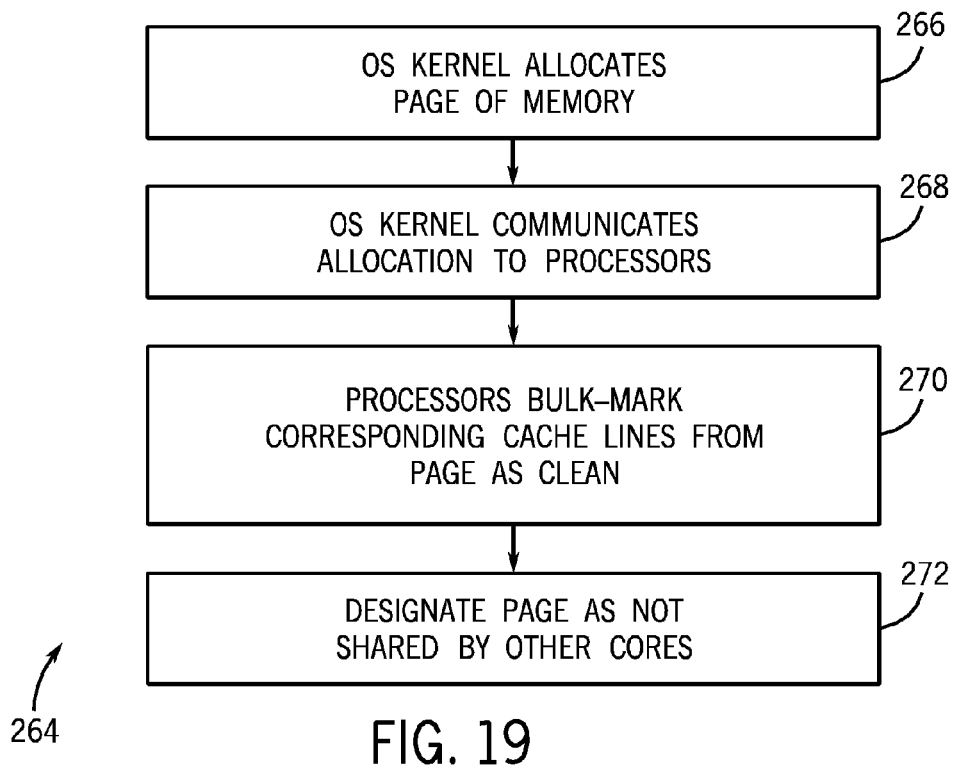
FIG. 19 flowchart describing a method of cache memory management when an operating system kernel allocates a page of memory, in accordance with aspects of the present disclosure.

Flowchart 264 of FIG. 19 describes a manner of hardware cache memory management when memory management software 242 of OS kernel 240 allocates a page of memory. Flowchart 264 may begin with step 266, when memory management software 242 of OS kernel 240 allocates a page of memory in software. In step 268, OS kernel 240 may communicate the event to CPU 16. Because the page of memory has been allocated, cache lines from the newly allocated page may have no defined value. Thus, in step 270, depending on the predetermined cache coherence protocol (e.g., MSI, MESI), cache memory 42 may mark as clean all cache lines associated with the newly allocated page. Further, in step 272, page status table 50 may designate the newly allocated page address as not shared. Alternatively, page status table 50 may stop tracking the newly allocated page address.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A central processing unit comprising:
   a plurality of processor packages, each processor package including a plurality of processor cores, each processor core having respective cache memory management hardware comprising:
   a cache memory device configured to store cache lines for use by a processor core of the plurality of processor cores, wherein each cache line corresponds to a portion of a page of memory;
   a page status table configured to store page status information, wherein the page status information includes a first status bit and a second status bit, wherein the first status bit indicates whether any portion of a page of memory corresponding to a cache line stored in the cache memory device is shared by another processor core of the plurality of processor cores from the same one of the plurality of processor packages and the second status bit indicates whether any portion of the page of memory corresponding to the cache line is shared by another processor core of the plurality of processor cores in a different one of the plurality of processor packages; and
   wherein the page status information further includes information indicative of a type of access performed on the page of memory corresponding to the cache line stored in the cache memory device;
   a cache controller configured to:
   determine, upon a cache miss, whether to broadcast a snoop request to any other processor cores based at least in part on the page status information stored in the page status table; and
   in response to receiving a notification from an operating system kernel that a page of memory has been unmapped by the operating system kernel, mark one or more cache lines corresponding to the page of memory for eviction, and cause to the page status table to mark the page of memory as not being in a shared state and to stop tracking the page of memory.

2. The central processing unit of claim 1, wherein the cache controller of each cache memory management hardware is further configured, upon a cache miss, to broadcast a snoop request to all other processor cores when the page status information indicates that any portion of the page to which a cache line of the cache miss corresponds is shared by a processor core from another one of the plurality of processor packages.

3. The central processing unit of claim 1, wherein the cache controller of each cache memory management hardware is further configured, upon a cache miss, to broadcast a snoop request only to other processor cores in the same one of the plurality of processor packages when the page status information indicates that any portion of the page to which a cache line of the cache miss corresponds is shared by a processor core from the same one of the plurality of processor packages but not shared by a processor core from a different one of the plurality of processor packages.

4. The central processing unit of claim 1, wherein the cache controller of each cache memory management hardware is further configured, upon a cache miss, to access a cache line from main memory without broadcasting a snoop request when the page status information indicates that no portion of the page to which the cache line of the cache miss corresponds is shared by any other processor cores.

5. The central processing unit of claim 1, wherein the page status table of each cache memory management hardware is further configured, upon receipt of a snoop request regarding a page to which a cache line stored in the cache memory device belongs, to store page status information indicating that a portion of the page is shared when such page status information is not stored in the page status table.

6. The central processing unit of claim 1, wherein the page status table of each cache memory management hardware is further configured, upon receipt of a snoop request regarding a page to which a cache line not stored in the cache memory device belongs, to clear page status information indicating that a portion of the page is shared when such information is stored in the page status table.

7. A method comprising:
tracking, from a processor of a first processor package of a central processing unit having a plurality of processor packages, wherein each of the plurality of processor packages includes a plurality of processors, whether any line of a page of main memory is shared by another processor of the first processor package and whether any line of the page of memory is shared by a processor of the plurality of processors of another processor package;
wherein the tracking comprises storing page status information for each line of the page memory, wherein the page status information for each line includes a first status bit indicating whether a corresponding line is shared by another processor of the plurality of processors of the first processor package, and a second status bit indicating whether a corresponding line is shared by a processor of the plurality of processors of a second processor package of the plurality of processor packages;
wherein the page status information for each line further includes information indicative of a type of access performed to a corresponding page of memory;
determining, upon a cache miss in the first processor for a line of memory of the page of main memory, whether to broadcast a snoop request to any other processors based at least in part on whether any line of the page of main memory is shared by the another processor of the first processor package or by the processor of the second processor package; and
responsive to receiving a notification from an operating system kernel that a page of memory has been unmapped by the operating system kernel, marking one or more cache lines corresponding to the page of memory for eviction, and updating the page status of the page of memory to indicate the page of memory is not in shared state, and to stop tracking the page of memory.

8. The method of claim 7, further comprising determining, upon the cache miss in the first processor for the line of memory of the page of main memory, to broadcast a snoop request to all other processors of the central processing unit any line of the page of main memory is shared by a processor of another processor package.

9. The method of claim 7, further comprising determining, upon the cache miss in the first processor for the line of memory of the page of main memory, to broadcast a snoop request only to other processors of the first processor package when any line of the page of main memory is shared by another processor of the first processor package but not by a processor of another processor package.

10. The method of claim 7, further comprising determining, upon the cache miss in the first processor for the line of memory of the page of main memory, not to broadcast a snoop request when no lines of the page of main memory are shared by another processor of the first processor package or by a processor of another processor package.

11. The method of claim 7, further comprising tracking, from the processor of the first processor package, whether any line of any page of main memory that is being used by the processor of the first processor package is shared by another processor of the first processor package and whether any line of any page of main memory that is being used by the processor of the first processor package is shared by a processor of another processor package.

12. The method of claim 7, further comprising tracking, from the processor of the first processor package, whether any line of any page in a predetermined number of pages of main memory most recently accessed by the processor of the first processor package is shared by another processor of the first processor package and whether any line of any page in a predetermined number of pages of main memory most recently accessed by the processor of the first processor package is shared by a processor of another processor package.

13. A central processing unit comprising:
a plurality of processors packages, each processor package including
a plurality of processor cores, wherein each processor core of the plurality of processor cores is configured to process data stored in cache lines;
cache memory device configured to store the cache lines, wherein each cache line corresponds to a line of a page of main memory;
a page status table configured to store information indicating whether any portion of a page of main memory corresponding to a cache line stored in the cache memory device is shared by another processor core;
wherein the page status table includes a plurality of entries, wherein each entry includes a first status bit and a second status bit, wherein the first status bit indicates whether a corresponding page of main memory is shared by another processor core from the same one of the plurality of processor packages, and wherein the second status bit indicates whether the corresponding page of main memory is shared by another processor core in a different one of the plurality of processor packages;
wherein each entry of the plurality of entries further includes information indicative of a type of access performed to the corresponding page of main memory;
a control circuit configured to:
in response to receiving a notification from an operating system kernel that a page of memory has been unmapped by the operating system kernel, mark one or more cache lines corresponding the page of memory for eviction; and
indicate to the page status table to mark the page of memory as not shared, and to stop tracking the page of memory; and
memory snoop circuitry configured to reference page address bits of a cache tag associated with one of the cache lines but not line number bits of the cache tag when another processor core attempts to access the one of the cache lines in main memory.

14. The central processing unit of claim 13, wherein the page status table of each processor package is further configured to store information indicating whether any portion of a plurality of pages is shared, wherein the plurality of pages comprises a predetermined number of most recently accessed pages.

15. The central processing unit of claim 13, wherein the memory snoop circuitry of each processor package is configured to reference the page address bits of the cache tag but not the line number bits of the cache tag when another processor core attempts to access the one of the cache lines in main memory, only when information in the page status table indicates that a page of main memory corresponding to the one of the cache lines is shared by the another processor core.

* * * * *